United States Patent [19]

Zolnowsky et al.

[11] Patent Number: 4,710,866
[45] Date of Patent: Dec. 1, 1987

[54] METHOD AND APPARATUS FOR VALIDATING PREFETCHED INSTRUCTION

[75] Inventors: John Zolnowsky; Lester M. Crudele, both of Austin; Michael E. Spak, Kyle, all of Tex.

[73] Assignee: Motorola, Inc., Schaumburg, Ill.

[21] Appl. No.: 930,941

[22] Filed: Oct. 7, 1986

Related U.S. Application Data

[63] Continuation of Ser. No. 530,820, Sep. 12, 1983, abandoned.

[51] Int. Cl.[4] .......................... G06F 11/00; G06F 9/38
[52] U.S. Cl. .................................... 364/200; 371/16
[58] Field of Search ... 364/200 MS File, 900 MS File; 371/15, 16

[56] References Cited

U.S. PATENT DOCUMENTS

| | | | |
|---|---|---|---|
| 4,370,710 | 1/1983 | Kroft | 364/200 |
| 4,476,525 | 10/1984 | Ishii | 364/200 |
| 4,484,308 | 11/1984 | Lewandowski et al. | 364/200 |
| 4,500,959 | 2/1985 | Kubo et al. | 364/200 |
| 4,521,851 | 6/1985 | Trubisky et al. | 364/200 |

Primary Examiner—Archie E. Williams, Jr.
Assistant Examiner—Thomas C. Lee
Attorney, Agent, or Firm—John A. Fisher; Jeffrey Van Myers

[57] ABSTRACT

A method and data processing system for validating prefetch instruction. The system includes an instruction unit, an n-stage pipeline which provides data segments representing instruction words from a memory to the instruction unit. The system further includes a circuit for prefetching instruction words to be executed subsequently to a presently executing instruction and a circuit for verifying the validity of the prefetched instruction word prior to execution thereof by the execution unit, and a circuit for causing the instruction unit to a fault condition only when the execution of an invalid instruction is begun.

2 Claims, 9 Drawing Figures

FIG. 2a

| 1/3 | 2/3 | 3/3 | x |

FIG. 2b

| 1/2 | 2/2 | x | x |

FIG. 2c

| 1/1 | 1/1 | x | x |

FIG. 2d

| 1/1 | 1/3 | 2/3 | 3/3 |

FIG. 3a

|  | F | F |
| 1/1 | 1/1 | x | x |

FIG. 3b

| V | F | F |
| 1/2 | 2/2 | x | x |

FIG. 3c

| V | VF | F | F |
| 1/3 | 2/3 | 3/3 | x | x |

METHOD AND APPARATUS FOR VALIDATING PREFETCHED INSTRUCTION

This is a continuation of application Ser. No. 530,820 filed Sept. 12, 1983, now abandoned.

TECHNICAL FIELD

This invention relates to data processors and more specifically to data processors having hierarchical memory arrangements such as cache-oriented processors or virtual memory systems.

BACKGROUND ART

Many modern data processing systems utilize multiple levels of storage of data and instructions. Cache memories are small high-speed memories located intermediate the larger, slower main memory and the central processing unit (CPU). Cache memories are loaded from the main memory, and if the data required by the CPU is resident in the cache, very rapid access thereto is available. If the particular required information is not resident in the cache, it must be located in the main memory and transferred, with other likely-to-be-needed information, to the cache.

Virtual memory systems may be similar in concept, but are generally employed for other purposes. In a virtual memory system a main memory is provided, and there may or may not be a cache associated with the memory to CPU access path. Because of the finite amount of memory which can be directly addressed by a CPU in a typical virtual system, an extremely large additional memory, frequently in the form of a magnetic disk memory, may be required to accommodate a very large program or data base.

Similarly as in the case of the cache memory, data is loaded from the disk into main memory such that the data is quickly accessible to the CPU. If the required data is not resident in main memory, a disk access is made to move a block of data into the main memory.

Depending upon the specific architecture of the data processing system, and specifically the length of each instruction to be executed by the data processing system, when a block of data is transferred either from the disk of the virtual machine into the main memory thereof or from the main memory to the cache of a cache-based machine, a particular instruction may extend across the boundary of the block of data transferred such that only a portion of the instruction actually becomes resident in the cache or in the main memory. For example, if the data word size of a particular processing system is sixteen bits, and various instruction types may have various instruction lengths from 16 bits to, for example, 48 bits or three words, a particular transfer of a block of data from the disk of a virtual machine into main memory may incompletely transfer a 48 bit long or a 32 bit long instruction. Thus when the CPU attempts to execute this incomplete instruction, an error condition will be detected, forcing the machine to execute exception handling routines to recover from that error.

In some central processing system organizations, entire instructions are loaded into the instruction execution unit or the instruction decoder and the invalidity of the instruction can be readily identified. In a CPU which employs a pipelined instruction accessing system, however, the incomplete transfer may not always be immediately detectable upon fetching of the instruction.

In such a pipelined system, while an instruction is currently being executed by the instruction execution unit of the CPU, the next instruction to be executed is concurrently being fetched from main memory. In the case where the data path between the main memory and the instruction execution unit is not as wide as the widest possible instruction (i.e. a 16-bit data path and a 48-bit instruction) the first 16 bit word of an incomplete instruction may be fetched and placed in the top of the pipeline, subsequently be advanced in the pipeline while the second 16 bit word of the incomplete instruction is fetched, and finally execution may be begun on the first 16 bit word of the instruction at the time a fetch is attempted for the missing third 16 bit word of the instruction.

One possible solution to this problem of avoiding the beginning of execution of words of incomplete instructions is to identify, upon the fetch of the first 16 bit word, the size of the instruction being fetched. If the instruction is a multiple-word length instruction, a fetch is immediately made of all required words to insure that they are resident in the memory. In such a system, a fault or error condition is generated immediately if the instruction is incomplete. In some instances however it is desirable to defer the taking of the fault until the first word of the invalid instruction is actually ready to execute rather than at the time it is being loaded into the head of the pipeline. For example, if the immediately preceding instruction (i.e. the instruction now under execution) causes a branch to another portion of the program, the invalid instruction being concurrently fetched may well not be required in this sequence of operations since the program well branch to a different instruction stream. Thus it is desirable to defer the commencement of the fault mechanism for as long as possible, which is usually to the point where the invalid instruction is prepared to execute or has just begun execution.

Accordingly, it is an object of the instant invention to provide a prefetch validation mechanism and a method for validating prefetched instructions such that in the event of an invalid instruction, the instruction execution unit executes a fault at the latest possible time during the execution of the instruction sequence.

It is a further object of this invention to provide a more efficient instruction execution technique in a pipelined CPU.

BRIEF SUMMARY OF THE INVENTION

These and other objects of the invention are accomplished in the instant invention by a data processing system comprising an instruction execution unit, an n-stage pipeline for providing data segments representing instruction words from a memory to the instruction execution unit; means for prefetching instruction words to be executed subsequently to a presently executing instruction and for verifying the validity of the prefetched instruction word prior to execution thereof by the instruction execution unit, and means for causing the instruction execution unit to defer to a fault condition when and only when execution of an invalid instruction is begun.

BRIEF DESCRIPTION OF THE DRAWINGS

FIGS. 2a, 2b, 2c, and 2d represent instruction words resident in memory at the boundary of the physical address space.

FIGS 3a, 3b, and 3c illustrate the fetch and verification patterns for instructions of various lengths.

DETAILED DESCRIPTION OF THE INVENTION

Figure 1:
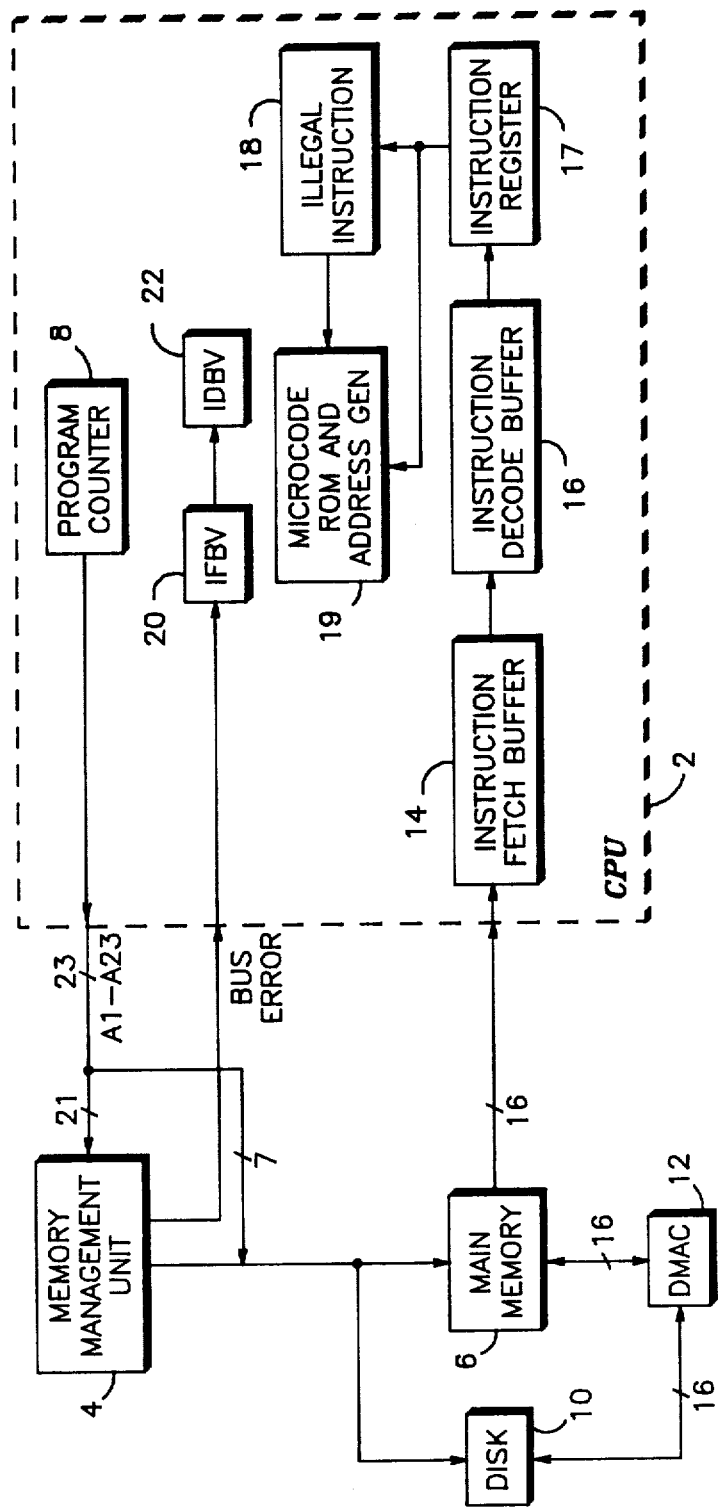
FIG. 1 is a block diagram of a representation of the elements of the invention as employed in a virtual memory oriented processor.

FIG. 1 is a block diagram representing the elements employed in this invention in a virtual memory oriented data processor.

A central processing unit (CPU) 2 has a plurality of address lines A1–23 connected to a memory management unit (MMU) 4 which provides a mapping function and address translation to translate the sixteen megabyte logical address range of the CPU (23 address lines) to a physical memory address within a much smaller main memory 6. In the particular configuration of FIG. 1, the generalized CPU 2 may be, for example, a microprocessor similar to the MC68000 microprocessor unit presently manufactured by Motorola, Inc. Certain logic to be described later would be incorporated into such a processor in order to implement the instant invention. The MMU 4 unit may be an MC68451 memory management unit also manufactured by Motorola, Inc.

In general, the CPU 2 includes a program counter 8 for providing the logical address to the MMU 4. In response to receiving the logical address, the MMU 4 examines a set of segment descriptors stored therein to determine whether this requested logical address is presently mapped into a physical address within the main memory 6. If the logical address is so mapped, the MMU 4 translates the logical address into the corresponding physical address for output to the main memory 6. In the event the logical address presented by the CPU 2 to the MMU 4 is not mapped into the physical address space of main memory 6, the MMU 4 generates a fault signal to indicate to the CPU 2 that a bus error has occurred. In general, the CPU 2 will respond to the fault signal by initiating a data transfer from a disk 10 or other suitable secondary memory system, sometimes through a direct memory access unit (DMAC) 12, to the main memory 6 in order to load into the main memory 6 the information at the requested logical address originally presented by the CPU 2 to the MMU 4.

In the instant invention, the instruction execution unit of the CPU 2 operates on data words 16 bits in length. Since an instruction, in the instant embodiment, may constitute one, two or three words, the data words are fetched from the main memory 6 in a pipelined fashion. That is, all instruction words are initially loaded from main memory 6 into an Instruction Fetch Buffer 14. A sequencer generates signals to sequence the occurrence of subsequent events. One output signal from the sequencer causes the word in the Instruction Fetch Buffer 14 to be loaded into an Instruction Decode Buffer 16, and the next sequential word in main memory 6, which may be a second instruction or second word of the first instruction, is loaded into this Instruction Fetch Buffer 14. On subsequent signals from the sequencer the word in the Instruction Decode Buffer 16 is partially decoded to begin execution and a fetch is begun of the next sequential word, which may be or the third word of a three word instruction from the main memory 6. The word in the Instruction Decode Buffer also is transferred to the Instruction Register 17 where execution continues after the prefetched word is placed in the Instruction Fetch Buffer 14 and the word previously there enters the Instruction Fetch Buffer 16. In this manner, instructions can be fetched from main memory 6 during the execution of a previous instruction to improve the efficiency in the operation of CPU 2. In this embodiment, a pipeline of two stages is used. In other embodiments the pipeline could be of different depth.

An Illegal Instruction Decode Register 18 is coupled to the instruction Register 17 to detect illegal instruction as will be further explained later. The Instruction Register is also coupled to a Microcode ROM Address Generator 19 which is part of the sequencer noted above. Coupled to the MMU 4 is an Instruction Fetch Buffer Valid Latch 20 which is in turn coupled to an Instruction Decode Buffer Valid Latch 22 as will be later discussed.

FIGS. 2a, 2b, 2c, and 2d represent instruction words as they may be aligned relative to the boundary line between those portions of code resident in main memory 6 and those currently remaining in the disk 10. For example, in FIG. 2a, each of the blocks represents one 16-bit instruction word. The denominator of the fraction in each of the blocks indicates number of words in that particular instruction while the numerator indicates which word of the instruction is contained in that particular block. The vertical dashed line between the first two blocks and the third and fourth block represents the boundary between the main memory 6 and the virtual memory or disk-resident data which is not physically present in the main memory 6. In the example shown in FIG. 2a, the block or "page" of data which has been transferred from the disk 10 into the main memory 6 contained only the first two words of a three-word instruction. After the contents of the first block (leftmost in FIG. 2) has been loaded into the Instruction Decode Buffer 16 of FIG. 1, the contents of the second block will be in the Instruction Fetch Buffer 14. At this point, the first word of the instruction is ready to begin execution at the same time the fetch of the third word of the instruction is to take place.

In FIG. 2b the two words within the physical memory depict a two-word instruction which is fully resident in main memory 6. FIG. 2c shows two successive one-word instructions which were located adjacent the boundary and thus both of those instructions are completely within main memory 6. FIG. 2d shows a one word instruction followed by the first word of a three word instruction.

In each case, when the processor instruction stream is about to cross the boundary between an instruction word which was actually stored in main memory 6 and an instruction word not so stored, a page fault indication is returned for the next prefetch. In all but the case set forth in FIG. 2a, the current instruction may be fully executed, and the taking of the fault postponed until this instruction has been executed. For example, in FIG. 2b, the first word of the two word instruction is ready to begin execution (i.e., it is in the Instruction Decode Buffer 16), and the second word has been successfully fetched (i.e., certain logic to be described later, has not indicated otherwise). Execution of this instruction may proceed, then, since it is irrelevant as to whether the next prefetch is valid or not.

In FIG. 2c, since the instruction presently in the Instruction Execution Buffer 16 is a one-word instruction, execution of it may proceed. Subsequently the second single-word instruction will also be executed since the success of the next following prefetch is irrelevant to the execution of the second single-word instruction.

In the case of FIG. 2d, the instruction in the Instruction Decode Buffer 16 will execute, but the subsequent instruction will not, since an error will have been noted on the fetch of the second word of the instruction. This is in contrast to the case of FIG. 2a where the processor must verify that the third instruction word has indeed been fetched successfully before the instruction begins execution.

FIGS. 3a, 3b, and 3c illustrate the fetch and verification patterns of instructions of various lengths. In FIG. 3a, in the case of one word instructions, the validity of the instruction words is checked at the beginning of the execution of the instruction, and the instruction must simply prefetch another word and keep track of its success. In the case of a two word instruction, as shown in FIG. 3b, the validity of the instruction word is checked at the beginning of the execution of the instruction since the second word has already been fetched and resides in the Instruction Fetch Buffer 14. Before the second word of the instruction may be used, a microcontrol word causes the CPU 2 to examine the successful fetch flag or the Instruction Fetch Buffer Valid flag 20 associated with the stage of the instruction pipeline where the second instruction word is stored. If the word was successfully fetched, instruction execution may continue, including the prefetch of the next two instruction word. If the word was not successfully fetched, the logic aborts the execution of the instruction and a page fault for the unsuccessful fetch of the second word is then taken. FIG. 3c shows the case of a three word instruction which is an extension of the two word case, but includes a validity check on the instruction word resident in the Instruction Fetch Buffer, as in the case above, but also includes a validity check of the third instruction word as it is being prefetched by the first word of the instruction.

Figure 4:
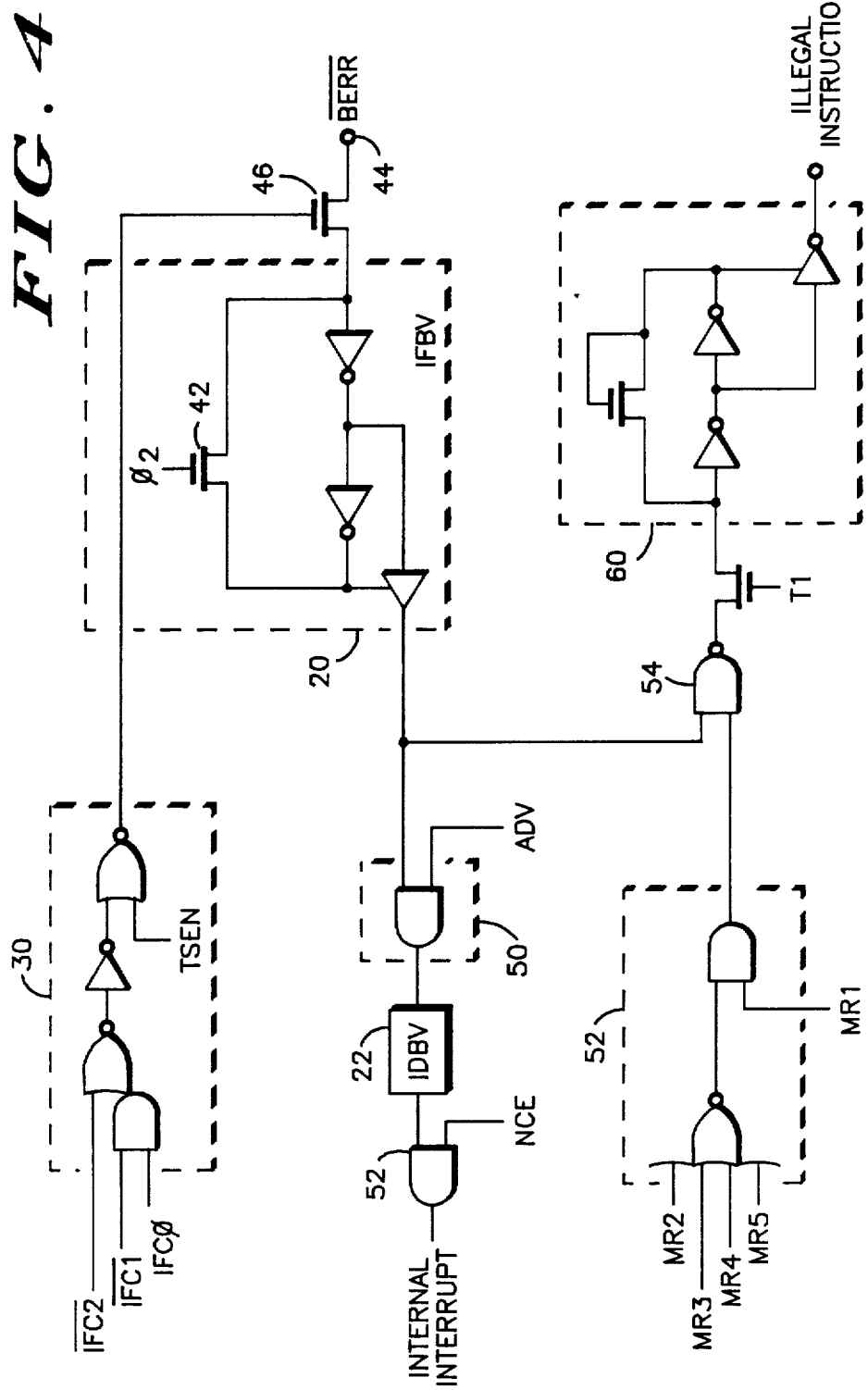
FIG. 4 is a logic diagram representative of circuitry used to implement the verification and fault mechanisms of the instruction execution unit of the instant invention.

FIG. 4 is a logic diagram representative of circuitry which may be used to implement the verification and fault mechanisms of the instruction execution unit of the instant invention. This logic for purposes of this disclosure utilizes signals generated by the MC68000 MPU, and by other similar devices, the specific logic of FIG. 4 or variations thereof is in addition to the logic presently used in the MC68000. A description of the functional signals of the MC68000 (i.e., pin functions) may be found in the published Data Sheet for the device or in the "16-Bit Microprocessor User's Manual" available from Motorola, Inc. A description of the microcode functions of the MC68000 may be found in U.S. Pat. No. 4,342,078, assigned to the asslgnee of the instant invention. That patent and particularly the discussion of FIGS. 4 and 5 therein also provides an explanation of the structure and operation of sequencer suitable for use in the instant invention.

As previously noted, instructions of different lengths are handled differently in the instant invention because of the requirement that a fault resulting from an unsuccessful fetch be taken as late as possible. That is, a normally-executing single word instruction is not interrupted because an invalid fetch attempt is made on a subsequent instruction.

Certain function codes may be provided within a central processing unit which indicate the cycle type currently being executed. The MC68000 mentioned above incorporates such a function code. In FIG. 4, function signals (IFC0, IFC1, IFC2), which are generated for presentation to output pins of the MC68000, are sensed, and the existence of a certain combination of signals indicating that the user program is being run is used to generate a signal to that effect in the logic shown in block 30 of FIG. 4. The signal TSEN is an internal signal which indicates that an external memory access is being performed, i.e., that the access was not an internal register access. If both these conditions are true, the resulting signal from block 30 is applied to the transistor 46 to gate the bus error signal into the Instruction Fetch Buffer Valid latch 20 as previously shown in FIG. 1. This latch will be latched in the high position only upon the occurrence of an active low input on the bus error signal input pin of the CPU at terminal 44. The transistor 42 is a sustaining transistor that is used upon the occurrence of a particular timing or clock phase.

Thus if the instruction currently being executed is a user instruction an external memory access has been performed, and, additionally, a bus error signal has been received from the MMU 4 indicating a fault condition, latch IFBV 20 will be set indicating that the data being fetched and entered into the Instruction Fetch Buffer 20 is invalid data. The output of this latch is applied to circuitry 50, here represented for simplicity by an AND gate, which AND's the IFBV set signal with a signal ADV generated by the executing instruction word to advance the next instruction word in the pipeline. Upon the occurence of this condition, when the word in the Instruction Fetch Buffer 14 is advanced to the Instruction Decode Buffer 16, the IFBV flag is advanced to the IDBV latch 22. The IDBV latch 22 is in turn coupled to an AND function 52 such that upon beginning of execution of the word residing in the Instruction Decode Buffer 16, an internal interrupt will occur, forcing a jump in the microcode of the processor and causing the processor to enter a special routine to handle an illegal condition. Thus upon the occurrence of the setting of the latch 20 and the loading of the invalid instruction word into the Instruction Fetch Buffer 14, the circuitry 50 will force a fault only upon the complete execution of the instruction presently in the Instruction Decode Buffer, since the internal interrupt is generated after the pipeline has been advanced. If, however, the instruction within the Instruction Decode Buffer 16 is a two or a three word instruction, while the first word of the instruction is apparently valid, the entire instruction is incapable of execution because of an invalid second or third word, as the case may be, of the multi-word instruction. In this case, the output of the latch 20 is also applied to additional circuitry including an AND gate 54 which AND's the set state of the IFBV latch 20 with certain outputs from tne microcode ROM (MR1-MR5) which indicate that the instruction presently being executed is a multi-word instruction and that the processor is using a later word of the instruction. The setting of the IFBV latch and the indication that the processor is using a later word of a multi-word instruction causes the setting of a latch of block 60 which forces an output and causes the immediate abortion of the current microcode sequence and a jump to a bus error sequence to recover from the error.

The microcode ROM outputs that are sensed by the logic 52 are generated by the very first microcode instructions which are executed at the beginning of execution of an instruction word. Thus the fault, even on a multi-word instruction, is taken prior to any destructive transfer of data within the CPU.

The operation of the logic of FIG. 4 will be described using each of the examples of FIG. 3 above.

Recall that in FIG. 3 those blocks to the right of the dashed line represent undefined instruction words, that is, words which are not presently available in main memory 6. The logic of FIG. 4 is provided to determine at what point the crossing of the dashed line by the instruction stream takes place and when it is detected by the processor and acted upon.

In the case of FIG. 3a, which is the case of a one-word instruction, the execution of the first one-word instruction itself does nothing to determine whether the instruction word it is fetching (i.e. the instruction word immediately to the right of the boundary line, the second one-word instruction having been previously fetched) is valid. This is so because the execution of the first one-word instruction which is known to be valid, is not dependent upon whether any other instruciton word is valid. It may be recalled that a feature of this invention is that faults are taken as late in the execution of the instruction stream as possible. Of course, since each instruction word has a provision within it to fetch subsequent instruction words, a fetch will be attempted of the word residing in the block immediately to the right of the boundary, and the appropriate flags will be set indicating that the fetch was unsuccessful, but since this is irrelevant to the execution of the first single word instruction itself, no check is made to see whether, in fact, a flag has been set. In this case, since a user program is being executed, and an external memory access is being made, the IFBV latch 20 is set upon the presence on terminal 44 of the Bus Error signal indicating that an unsuccessful fetch was attempted. With the first one-word instruction located in the Instruction Decode Buffer 16, and the second one-word instruction located in the Instruction Fetch Buffer 14, the execution of the first instruction begins by examining the IDBV latch 22 to determine that the instruction itself is valid, then initiating a fetch of the next instruction word (immediately to the right of the boundary), and advancing the pipeline. The first instruction, has been copied in part into the Instruction Register 17, which contains that portion of the instruction initiating data transfers or operations within the CPU. Since the sequencing has been initiated, the contents of Instruction Decode Buffer 16 are no longer needed and the second one-word instruction is read into that buffer on the advance command. Simultaneously the third instruction word is fetched and a bus error results since the fetch is unsuccessful. Since a user program is being executed and an external access is being made, the bus error in conjunction therewith sets the IFBV latch 20 indicating that the contents (just fetched) of the Instruction Fetch Buffer 14 is invalid. Note that no need yet exists to take a fault, since the first one-word instruction may execute properly regardless of the contents of the Instruction Fetch Buffer 20.

Upon completion of the execution of the first one-word instruction, the second one-word instruction, now in the Instruction Decode Buffer may begin execution by beginning its fetch of the next word (fourth word) and initiation of a pipeline advance whereby the second one-word instruction is copied into the Instruction Register Buffer 17 for completion of execution, the invalid word in the Instruction Fetch Buffer is advanced to the Instruction Decode Buffer, and another unsuccessful fetch is attempted.

Since IFBV latch 20 was previously set, the pipeline advance signal sets the IDBV latch 22. The illegal fetch, of course, ensures that the IFBV latch 20 remains set. Again no fault is yet taken, since the currently executing instruction does not require further instruction words for execution. Since IDBV latch 22 is set however, as the second one-word instruction completes execution and the word in the Instruction Decode Buffer 16 begins execution, a signal indicating the start of a new cycle NCE is generated, and since IDBV latch 22 is set an internal interrupt is generated causing a microcode jump to an error handling routing.

In terms of the actual microinstruction sequence, when an instruction word is read into the Instruction Register 17 to begin execution thereof, it is decoded and a portion of the decoded instruction is used, together with other conditionals, to select the first microinstruction from the microROM and nanoROM. The first microinstructions cause the next instruction word to be fetched and the pipeline advanced. Since the executing instruction is a one-word instruction, the microinstructions do not validate the instruction words in the Instruction Decode Buffer 16 or the Instruction Fetch Buffer 14. The sequencer simultaneously performs the remainder of the operations specified by the instruction, for example, a register-to-register data transfer. Lastly the sequencer causes the instruction in the Instruction Decode Buffer 16 to be advanced into the Instruction Register.

In the case of FIG. 3b, the first word of a two-word instruction is transferred to the Instruction Decode Buffer 16, the second word is fetched and loaded into the Instruction Fetch Buffer 14. As the first word begins execution, it examines the IFBV latch 20, since it is a two-word instruction. Since IFBV latch 20 is not set, the first word initiates the next fetch and a pipeline advance. The first word enters the Instruction Register 17, the second word is transferred to the Instruction Decode Buffer 16 and a fetch is attempted of the third word, which attempt fails. IFBV latch 20 is set and invalid data is transferred to the Instruction Fetch Buffer. As the second word begins execution, it initiates a pipeline advance, is loaded into Instruction Register 17 and initiates another fetch, which again is unsuccessful. The pipeline advance sets the IDBV latch 22 and the first invalid word is transferred to the Instruction Decode Buffer 16. As the invalid instruction is prepared to begin execution, the NCE signal is generated causing an internal interrupt as above.

In terms of the microinstruction sequence, when the first word of a two-word instruction is read into the Instruction Register 17, the first selected microinstruction may cause the next instruction word to be fetched to the Instruction Fetch Buffer 14 and the pipeline advanced. Since the executing instruction is a two-word instruction, a subsequent microinstruction causes the sequencer to examine the validity of the next instruction word, i.e., the word residing in the Instruction Decode Buffer 16, by examining the Instruction Decode Buffer Valid Latch 22. If the latch is set, a fault is taken. If the latch is not set, the sequencer subsequently performs the remainder of the operations specified by the executing instruction word and then causes the word in the Instruction Decode Buffer 16 to be advanced into the Instruction Register 17.

The case of FIG. 3c is a three-word instruction case, where a fetch and validation must occur simultaneously. The first word of the three-word instruction is in the Instruction Decode Buffer 16 and the second word is in the Instruction Fetch Buffer 14. Both having been successfully fetched, neither the IFBV latch 20 nor the IDBV latch 22 is set.

As the first word begins execution, it initiates a fetch of the third word and a pipeline advance. Since the fetch is unsuccessful, IFBV latch 20 is set and the first word is transferred to the Instruction Register 17. The second word, following the pipeline advance is in the Instruction Decode Buffer 16 and the invalid third word is in the Instruction Fetch Buffer 14 with IFBV latch 20 set.

As the initial sequencing begins, bits MR1-MR5 of the Control ROM are examined. The presence of these bits indicates a three word instruction in Logic 53 and, through AND gate 54 a latch 60 is set which immediately generates an Illegal Instruction signal which is provided to the exception handling logic of the ROM Address generation circuitry (See U.S. Pat. No. 4,342,078) prior to the transfer of any register data under control of the contents of the Instruction Register 17 (the first instruction word).

Thus in each case, the fault due an unsuccessful fetch has been taken at the latest possible time, i.e. any instruction capable of execution is executed even if a subsequent fetch is known to be erroneous.

While the invention has been described in terms of a preferred embodiment thereof, it is understood that variations will occur to those skilled in the art which are within the scope of the invention which is only limited by the claims appended hereto.

We claim:

1. In a data processor which executes predetermined sequences of instructions comprising programs stored in a memory, each instruction consisting of at least m instruction units, but on more than n instruction units where m is an integer greater than zero (0) and n is an integer greater than or equal to m, the data processor comprising:

an n-stage instruction pipeline for storing in each stage one instruction unit;

instruction execution means, coupled to the instruction pipeline and responsive to the one of said instructions stored in the instruction pipeline beginning at an output end thereof and ending at an m-th stage thereof, the instruction execution means executing said one of said instructions and providing an instruction prefetch signal during the execution thereof;

instruction prefetch means, coupled to the instruction execution means and responsive to the instruction prefetch signal, for fetching each instruction unit of the next instruction in said predetermined sequence of instructions from said memory; and instruction pipeline control means, coupled to the instruction prefetch means and to the instruction pipeline, for storing each instruction unit fethed by the instruction prefetch means into an input stage of the instruction pipeline after advancing the instruction unit stored in each stage of the instruction pipeline into the next higher stage thereof, until the first instruction unit of the instruction to be next executed by the instruction execution means in stored in the output stage of the instruction pipeline;

a prefetch validation circuit comprising:

n serially-connected validation latches, each corresponding to a respective stage of the instruction pipeline and serially advancing in synchronism therewith, for storing a validation bit indicative of the invalidity of the instruction unit stored in the corresponding stage of the instruction pipeline;

prefetch error detecting means, coupled to the instruction prefetch means and to the validation latch corresponding to the input stage of the instruction pipeline, for detecting errors occurring during the fetch of each instruction unit which indicate the invalidity of that instruction unit, and storing the valadition bit as an indication of said detected error in the validation latch corresponding to the input stage of the instruction pipeline into which said invalid instruction unit is stored; and instruction validation means, coupled to the instruction pipeline and the validation latches, for generating an invalid instruction signal if the validation bit stored in the validation latch corresponding to any of the m instruction units stored in the m highest stages of the instruction pipeline, comprising the next instruction to be executed by the instruction execution means, indicates that the instruction unit stored in the corresponding stage of the instruction pipeline is invalid.

2. In a data processor which executes predetermined sequences of instructions comprising programs stored in a memory, each instruction consisting of at least m instruction units but on more than n instruction units, where m is an integer greater than zero (0) and n is an integer greater than or equal to m, the data processor comprising:

an n-stage instruction pipeline for storing in each stage one instruction unit, instruction execution means, coupled to the instruction pipeline and responsive to the one of said instructions stored in the instruction pipeline beginning at an output end thereof and ending at an m-th stage thereof, the instruction execution means execution said one of said instructions and providing an instruction prefetch signal during the execution thereof;

instruction prefetch means, coupled to the instruction execution means and responsive to the instruction prefetch signal, for fetching each instruction unit of the next instruction in said predetermined sequence of instructions from said memory; and instruction pipeline control means, coupled to the instruction prefetch means and to the instruction pipeline, for storing each instruction unit fetched by the instruction prefetch means into an input stage of the instruction pipeline after advancing the instruction unit stored in each stage of the instruction pipeline into the next higher stage thereof, until the first instruction unit of the instruction to be next executed by the instuction execution means is stored in the output stage of the instruction pipeline;

a prefetch validation method comprising the steps of:

detecting errors occurring during the fetch of each instruction unit which indicate the invalidity of that instruction unit;

storing an indication of said detected error as a validation bit in a validation latch corresponding to with the input stage of the instruction pipeline into which said invalid instruction unit is stored;

serially advacing each validation bit into a validation latch corresponding to a next stage of the instruction pipeline in synchronism with a repective stage of the instruction pipeline; and generating an invalid instruction signal if the validation bit stored in the validation latch corresponding to with any of the m instruction units stored in the m highest stages of the instruction pipeline, comprising the next instruction to be executed by the instruction execution means, indicates that the instruction unit stored in the corresponding stage of the instruction pipeline is invalid.

* * * * *

UNITED STATES PATENT AND TRADEMARK OFFICE
CERTIFICATE OF CORRECTION

PATENT NO. : 4,710,866

DATED : December 1, 1987

INVENTOR(S) : John Zolnowsky et al

It is certified that error appears in the above-identified patent and that said Letters Patent is hereby corrected as shown below:

Column 9, line 36, change "on" to --no--;

Column 9, line 57, change "fethed" to --fetched--;

Column 10, line 28, change "on" to --no--;

Column 10, line 40, change "cution" to --cuting--;

Column 10, line 65, delete [with];

Column 10, line 67, change "advacing" to --advancing--; and

Column 11, line 5, delete [with].

Signed and Sealed this

Thirteenth Day of September, 1988

Attest:

DONALD J. QUIGG

*Attesting Officer*　　　*Commissioner of Patents and Trademarks*